Nov. 8, 1949     G. W. HARDY     2,487,239
PROPELLER FOR AIRCRAFT
Filed Feb. 19, 1943     3 Sheets-Sheet 1
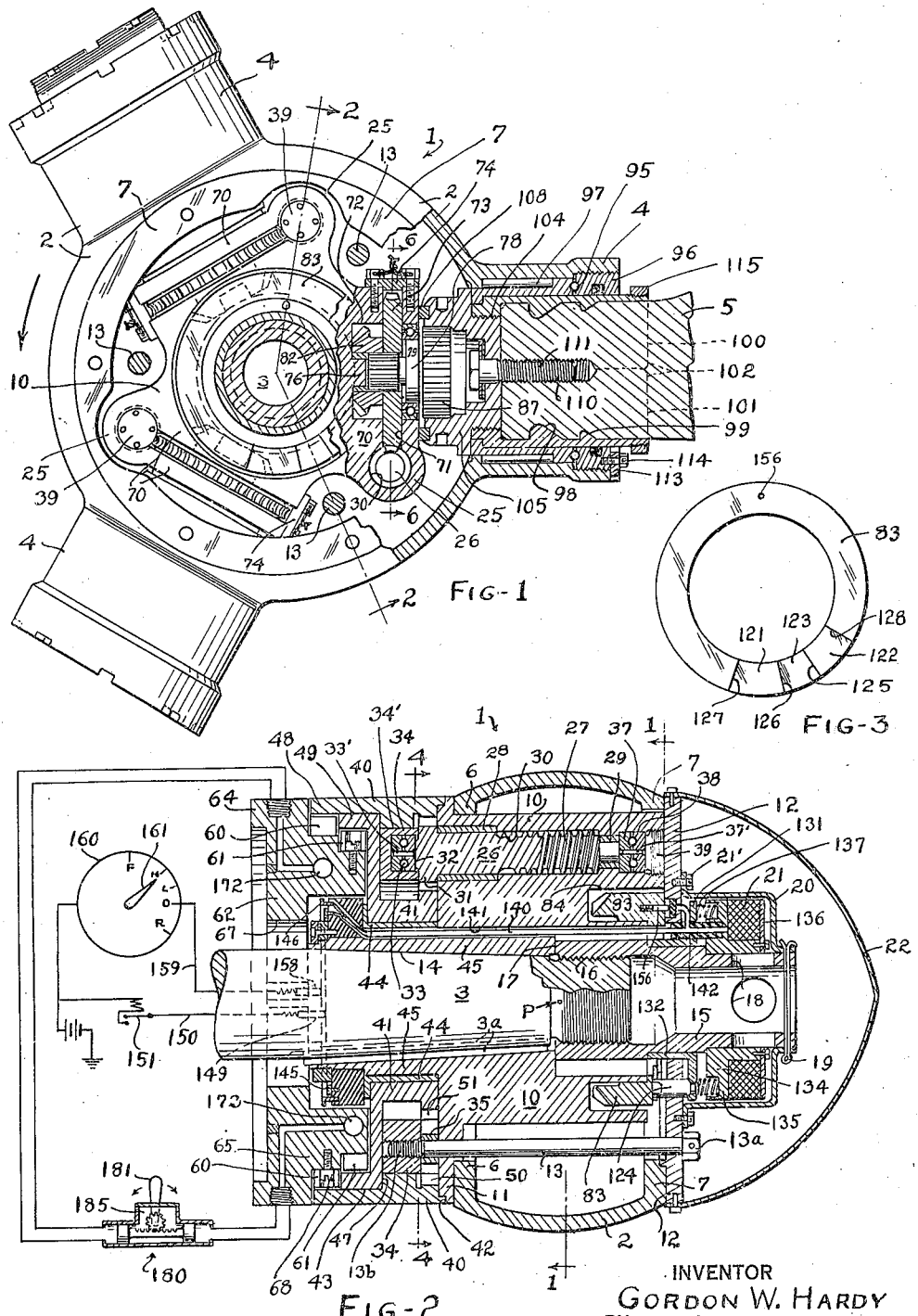
INVENTOR
GORDON W. HARDY
BY
*George M. Soule*
ATTORNEY Nov. 8, 1949 G. W. HARDY 2,487,239
PROPELLER FOR AIRCRAFT
Filed Feb. 19, 1943 3 Sheets-Sheet 2

INVENTOR
GORDON W. HARDY
BY
George W. Soule
ATTORNEY

Nov. 8, 1949          G. W. HARDY          2,487,239
PROPELLER FOR AIRCRAFT
Filed Feb. 19, 1943          3 Sheets-Sheet 3
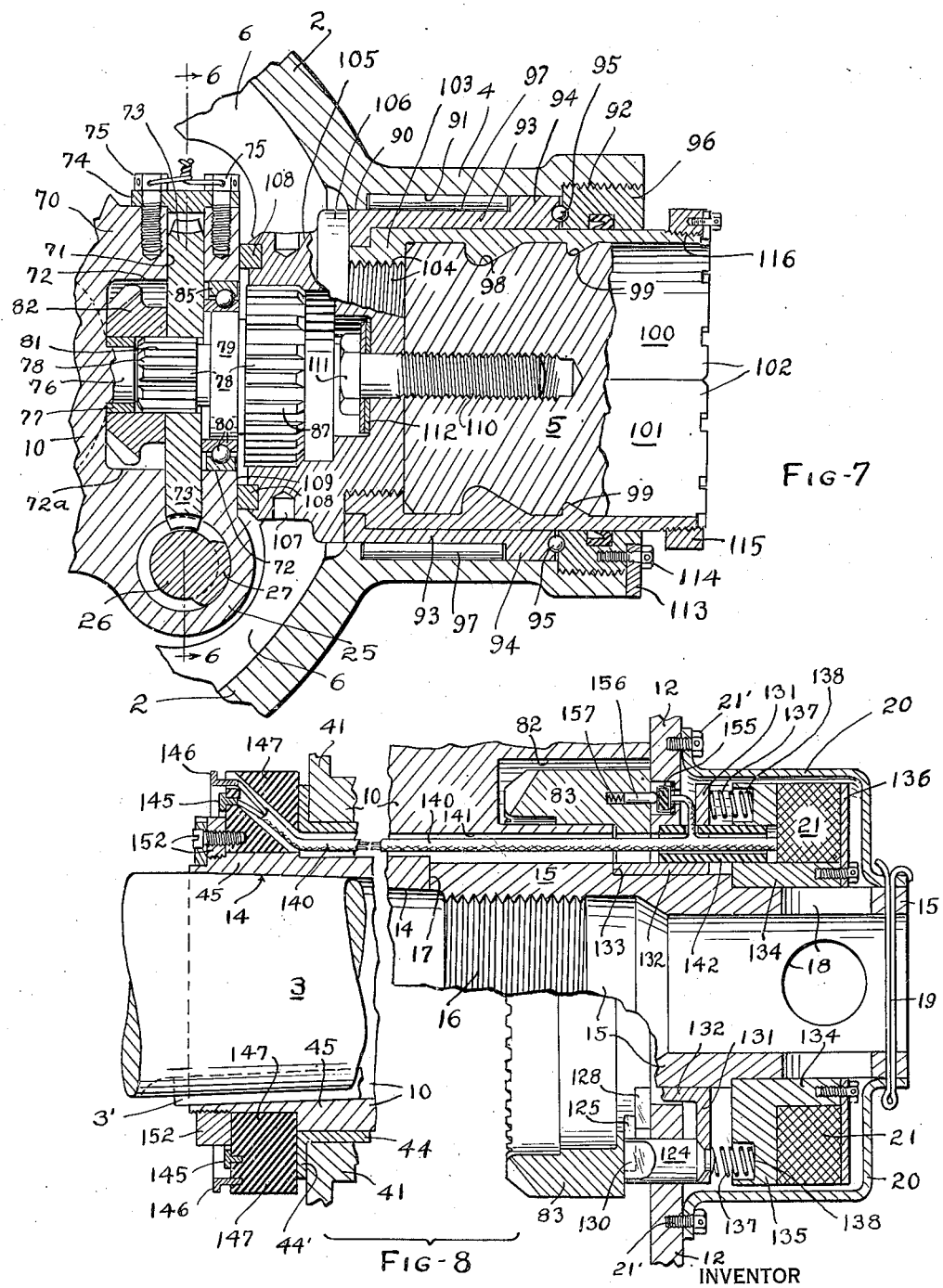
INVENTOR
GORDON W. HARDY
BY
George M. Soule
ATTORNEY Patented Nov. 8, 1949

2,487,239

UNITED STATES PATENT OFFICE 2,487,239

PROPELLER FOR AIRCRAFT

Gordon W. Hardy, Cleveland Heights, Ohio, assignor to The Marquette Metal Products Company, Cleveland, Ohio, a corporation of Ohio Application February 19, 1943, Serial No. 476,398

8 Claims. (Cl. 170—160.29)

This invention relates to propellers for aircrafts, and particularly to improvements in mechanism for adjusting the propeller blades to different pitch angles during flight or while under load.

The objects include the provision of an improved controllable pitch propeller mechanism having one or more of the following characteristics: Simplicity of construction and assembly; compactness; light weight, substantially self-balancing construction as made, but with simple and effective provision for rebalancing if necessary due to adjustment take up of tolerances; fully enclosed construction so that all the moving parts are protected from grit, water and other abrasive or corrosive influences; capability of very rapid normal operation through a full range of forward drive blade pitch settings and also capable of rapid adjustment to blade feathering and/or reverse positions; protection against accidental movement of the blades to feathering and reverse pitch positions; simple and effective provision for accurately indicating to the operator instantaneous pitch angles and direction of effective inclination of blades, whether forward or reverse; provision for enabling, under accurate operator-control, the power furnished by rotation of the propeller to shift the blades quickly throughout the entire desired ranges of pitch angles, and an improved means of smoothly controlling such power to shift the blades while rotating at driving speed.

More specific objects are to provide an improved electrically operated pitch angle indicating means for a controllable pitch propeller; an electrically operated blade angle position limit selector operable for feathering and/or reverse pitch separate from forward driving pitch range from low to high pitch; an improved manner of unitarily arranging self-locking, blade adjusting gearing elements; an improved high reduction driving connection between a control actuator such as a friction brake or clutch and positive, mechanically acting, blade adjusting and equalizing gearing; an improved mounting on the propeller hub for the blades, and an improved friction operated actuating means for a blade-angle-control gearing.

Other objects will become apparent from the following description of the preferred form of the invention shown in the accompanying drawings wherein:

Fig. 1 is a front end elevation and fragmentary sectional view (see line 1—1 on Fig. 2) of the propeller hub and hub carrier assembly;

Fig. 2 is a longitudinal sectional view of the entire hub mechanism taken substantially as indicated at 2—2 on Fig. 1;

Fig. 3 is a forward end or plan view of a blade-equalizing gear element embodying selectively operable limit stops for the gear, hence the blades;

Fig. 7 is a relatively enlarged fragmentary sectional view of one blade mounting and adjusting mechanism unit according to Fig. 1, and Fig. 8 is a fragmentary detail view of a portion of the hub mechanism as shown in Fig. 2 (same scale as Fig. 7).

General arrangement

Figure 4:
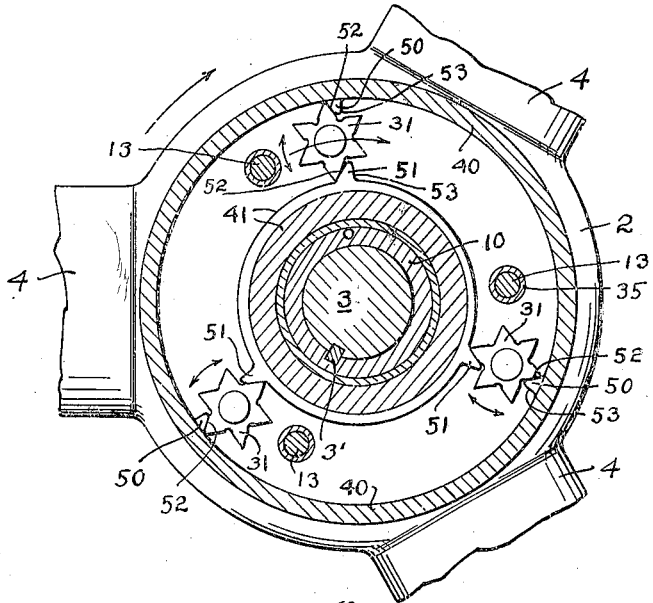
Fig. 4 is a transverse sectional view taken at 4—4 on Fig. 2, showing a cam mechanism for operating the blade adjusting gearing.

In the present propeller blade pitch control mechanism, the blades (two or more, three being shown for illustration) are turned in opposite directions for pitch adjustment on their radially disposed axial mountings by self-locking worm gear mechanism units which are all alike and completely supported for operation in equally spaced, hence balanced positions about the main hub axis. Said worm gear mechanisms are supported entirely on a main rigid hub carrier body which supports the hub on the propeller shaft. The blade mountings are also identical hence one only of said mountings and only one worm and gear mechanism will be described in detail.

Hub construction

In Fig. 1 the hub body or shell 2 (hereinafter, for brevity, "hub" 2) of the hub and blade assembly 1 is preferably a high tensile strength steel forging which is capable of being machined and finished after hardening treatment without hand work according to my Patent 2,450,660 issued October 5, 1948, owned by the assignee hereof. The central part of said hub is spherical as will be observed by comparison of Figs. 1 and 2, having the same external radius of curvature in all directions about the center point P, Fig. 2, of the hub lying on the axis of the propeller drive shaft. An end portion of said drive shaft is shown at 3. Radial tubular extensions 4 of the hub 2, whose axes intersect at point P, support the blades 5, a root or shank portion of one of which is shown in Fig. 1. The hub 2 has rearwardly and forwardly disposed inturned parallel flange portions 6 and 7 joining the central spherical part of the hub.

Hub carrier etc.

The hub carrier 10 is also preferably a high tensile steel forging (metal similar to that of the hub) and has a rear flange 11 joined to the hub flange 6, as by a series of suitable screws not shown. The carrier 10 extends through the hub and hub flange 7 with its forward surface substantially flush with the forward surface of the hub at the hub flange 7. A front hub plate 12 extends across the hub carrier and flange 7 of the hub, being secured to said flange as by screws. Main through bolts or studs 13 (three in the case of a three blade propeller) align and secure the hub carrier, hub and front plate together into a rigid unit. The studs 13 have heads 13a bearing against the front plate 12 (wired in place). The rearward ends of the studs and connections made therewith are described later.

The hub carrier 10 is centrally bored at 14 to receive the usual tapered end portion of the propeller shaft 3; (keyed to the shaft at 3' and, forwardly beyond the taper fit, a tubular nut 15 threaded to the propeller shaft at 16 is jammed against a shoulder 17 on the hub carrier to hold the hub assembly firmly in place. A tubular forward end of the nut 15 has cross holes 18 for receiving a capstan type wrench bar; and forwardly beyond the wrench holes the nut is held from turning by a cotter pin 19 passed through the nut and the forward reduced end of a metal cap 20 forming a housing for an electromagnet or solenoid coil 21, the function of which will be described later. The cap 20 is screwed to the end plate 12 (cap screws 21'), and the screw heads are wired in place in a well known manner.

A front or nose piece 22 (bullet nose shaped as shown) covers the cap 20, concealing it and the attaching bolt heads, nuts, etc. on the front plate 12. The manner of attaching the nose piece is obvious from Fig. 2, attaching screws wired as required.

Blade adjusting gearing

The worm and gear wheel assemblies, heretofore mentioned, largely determine the shape of the hub carrier 10, the latter being built in a fully balanced symmetrical manner completely to support said assemblies as well as equalizing gearing for the blades. As apparent from Figs. 1 and 2, equally circumferentially spaced journal portions 25 (for worm shafts 26 with integral worm threads 27) are formed on the hub carrier, one beside each blade root or shank mounting. The worm shafts are parallel to each other and the propeller shaft and are journaled in bronze or other suitable bushings 28 and 29 in opposite ends of bores 30 of the portions 25 which bores receive the worm shafts.

Actuating cam mechanism

The rearward ends of the worm shafts 26 project beyond the bushings 28 and each carries a driving member 31 which preferably, for reasons given later, are star wheels (see Fig. 4) by which the worm shafts are turned through relatively small increments of adjustment and selectively in opposite directions at the will of the operator or by automatic means as desired, following known practice in the latter case. In the particular embodiment disclosed hereby, manually and selectively operable means is shown for initiating the operation of the worm shafts.

Beyond the star wheels, in a forward direction, the worm shafts have short stub portions 32 adapted to abut respective self-contained antifriction thrust bearing assemblies 33 in sockets of a common supporting ring 34 (e. g. bronze) maintained in place by the rearwardly threaded ends 13b of the hub-assembly-securing studs 13 which are screwed into the ring 34 and force the ring against spacing collars 35 surrounding the studs 13 and bearing forwardly against the hub carrier. The spacing collars 35 maintain proper working clearance for the star wheels between the bronze ring and the hub carrier; and rearward movement of the worm shaft out of place is resisted and prevented by the bronze ring and studs 13 through the intermediary of the thrust bearings 33.

Gearing—Continued

The opposite reduced diameter forward ends of the worm shafts which enter the bushings 29 are positioned to abut respective self-contained antifriction thrust bearing assemblies 37 seated rearwardly against counterbores 38 in the hub carrier leading rearwardly from the face of said carrier which abuts the front plate 12. Take-up adjustment for the thrust bearing assembly (both sets 33 and 37) is secured by threaded plugs 39 in the outer ends of the counterbores, which plugs may be prevented from retracting movement either by abutment with the front plate 12 or by the insertion of shims (where necessary) until the spaces, axially, are exactly filled.

The thrust bearing assemblies 33 and 37 may be of a known type having pins 33' and 37' holding the race members loosely together but in a manner to retain the rolling elements (balls) against dropping out while inserting the assemblies.

Brake wheels and supports

The bronze ring 34, into which the main studs 13 are screwed to support it, forms a bearing at 34' for the outer one (40) of two concentric actuating rings or wheels 40 and 41 for indexing the worm shafts through the star wheels or cams 31. The ring or wheel 40 bears and rotates in part also on a circular shoulder 42 cut in the rear outer flange portion 11 of the hub carrier and, further, on an outer cylindrical smooth face 43 of the inner ring or wheel 41 which latter is, in turn, journaled on a suitable (e. g. bronze) bushing 44 surrounding a rearward tubular extension 45 of the hub carrier closely fitting the propeller shaft for support. The main bearing supports for the two wheels 40 and 41 are, however, the bronze bushing 44 for the inner wheel 41 and the bronze ring 34 for the outer wheel. The bushing 44 is maintained in place on the carrier extension 45 against movement rearwardly by means to be described later and said bushing 44 is flanged at 44' to abut the wheel 41 and prevent rearward movement thereof as will be apparent. The wheel 41, in turn, through being positioned to abut a shoulder 47 on the wheel 40, prevents the latter from moving rearwardly. Both wheels 40 and 41 are in light contact with the rear hub carrier face to prevent said wheels from movement out of place forwardly along the propeller shaft. Thus the wheels are free to turn about the axis of the propeller shaft at all times, the working clearances being such that they can turn of their own inertia if the propeller hub is rotated suddenly from stopped position but ordinarily they stay in rotated position on and turn with the hub.

Cam mechanism—Continued

Each ring or wheel 40 and 41 has a set of driving dogs or cams 50 and 51 respectively, so shaped as to turn the star wheels 31 through approximately 60° when moved into contact therewith and relatively past the star wheels circumferentially of the propeller hub assembly.

Preferably the star wheels have six generally triangularly shaped teeth and the cams or dogs of the wheels 40 and 41 are three per set (for a three blade propeller) and shaped on the normal star-wheel-engaging sides 52 generally complementary to the star wheel teeth but, on the opposite sides, 53, nearly radially of the wheels. The radial faces of the dogs or cams 50 and 51 are designed to prevent locking of the star wheels by one set of dogs when the other set is actuated to operate the worm shafts by turning the star wheels and the first set is in what would otherwise be an interfering position.

The wheels 40 and 41 have brake-drum-constituting flanges 48 and 49 (Fig. 2) of somewhat different diameters and positioned side by side for controlled operations by brake shoe assemblies 60 and 61, respectively, on a fixed (non-rotating) mounting frame 62 (cf. Fig. 5) of annular form loosely surrounding the propeller shaft 3 and which, together with the brake mechanism generally, will be described later. For the moment it will be seen that, when the propeller hub assembly is rotated and one brake wheel (e. g. 40) is retarded the worm shafts will be turned intermittently in one direction through the star wheel and cam mechanism (e. g. counter-clockwise Fig. 4; clockwise Fig. 1); and that, when the other wheel (e. g. 41) is retarded, the worm shafts are turned in the opposite direction in their journals on the hub carrier. Such opposite turning of the worm shaft simultaneously adjusts the propeller blades through mechanisms described later herein.

Constructional variations

It should be noted that in a propeller having two controllable blades there would be, respectively, only two worm and worm wheel assemblies, hence two star wheels, in which event maximum relative reduction in driving effect between the brake retarded wheels and worm shafts would be secured by the provision of only two cams or dogs 50 and 51 on each brake controlled wheel 40 and 41. To decrease the reduction ratio, that is, to secure less reduction, the number of cams or dogs 50 and 51 is increased or spaced more closely together, but equidistantly, on respective wheels. In addition to obtaining relatively great reduction drive the star wheel and driving cam arrangement has a further advantage, namely, that for equal angular retardation of both wheels 40 and 41 each has the same or nearly the same reduction ratio in respect to turning the worm shafts, which would not be true of an internal-external gear arrangement with constantly meshing pinions to drive the worm shafts, although such an arrangement could be used herewith.

The inner and outer sets of dogs or cams 50 and 51, incidentally, need not operate on one and the same set of star wheels. Two sets of star wheels could be independent of each other if desired as by being placed in pairs side by side axially along the worm shafts and coupled therewith by one-way-rotation or "free wheeling" clutches (not shown). Thereby the star wheels actuated by one set of cams would not be moved by the other set and each could have cam surfaces individually adapted to its respective position and angles of incidence with the star wheels.

Blade adjusting gearing—Continued

Figure 6:
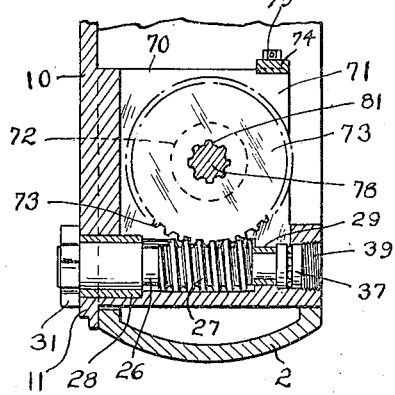
Fig. 6 is a detail sectional view as indicated at 6—6 on Figs. 1 and 7.

Referring to Figs. 1, 6 and 7, the hub carrier has, on three sides, thickened portions 70 balanced about the propeller axis and provided with accurately milled parallel sided slots 71 in the principal tangential planes of said portions, that is, in planes perpendicular to the propeller blade mounting axes, and directly adjacent to the blade mountings. The manner in which the hub carrier can be milled to form the slots in intersecting relation to the worm receiving portions of the worm shaft bores is apparent from comparison of Figs. 6 and 7. Additionally, short radial bores 72 are formed in said thickened portions at right angles to the planes of the slots 71 and in alignment with the propeller blade mounting axes. Flat worm wheels 73 are slid into place in the slots 71 in mesh with the worm threads 27 and the unattached sides of the slotted portion 70 of the carrier are secured rigidly together as by a tie piece 74 of the shape shown by comparison of Figs. 6 and 7 fastened in place by screws 75 in pairs with mutually wired heads.

The radial bores 72 extend inwardly beyond the worm wheels at 72a (Fig. 7), and short fixed cylindrical stubs 76 are formed at the bottom portions of the bores, concentric therewith, said stubs each supporting a bushing 77. The worm wheels are centered in the bores 72 by short or stub shafts 78 each having a cylindrical portion 79 intermediate of its ends carried in a ball bearing assembly 80 and an inner splined portion 81 which fits a complementary splined opening in the associated worm wheel and, additionally, a similar internal spline in the hub of a miter gear 82 accurately journaled on the bushing 77 of the associated stub 76.

Blade equalizing gearing

The miter gears 82 (one for each worm wheel) have teeth in mesh with complementary teeth of a common blade equalizing ring gear 83 (Figs. 2 and 8) journalled in annular opening 84 in the outer end of the hub carrier and held for free rotation in said opening 84 in the outer end of the hub carrier by abutment with the hub end plate 12. The opening 84 intersects all the radial bore portions 72a at the regions in which the teeth of the pinions 82 mesh with the teeth of the ring gear. Other functions of the ring gear 83 (than equalizing) will be described later herein.

Gearing generally—Cont'd

Referring again to the splined stub shafts 78 (Fig. 7) the outer race member 85 of the bearing assembly 80 may be pressed or firmly locked, as by spinning into place (i. e. riveting over of hub carrier metal thereon), in its receiving bore 72 of the hub carrier, and the inner bearing race member is thereby always held (through the bearing balls) in contact with the worm wheel.

Only respective outer splined portions 87 of the stub shafts 78 of the miter gear and worm gearing assembly units, above described, make operating driving contact with the blade mountings; and the entire hub carrier with the complete gearing thereon can be inserted endwise into the hub 2, the rear flange 6 of which need only be cut away appropriately as will be evident without illustration, to allow the radially projecting portions of the hub carrier and gear mechanism to pass therethrough. Particularly, the worm wheels 73 and worm gear mechanisms can be made much larger (greater diameter than shown, if desired for greater effective speed reduction) than would be possible if the worm wheels were mounted on the root mounting assemblies of the respective blades and had to be passed radially through blade-supporting tubes 4 of the hub; unless, of course, said tubes were made disproportionately large in inner diameter, i. e. larger than they would need to be for proper strength and/or should be to economize in the weight at such substantial distance from the propeller hub axis.

*Blade mountings*

The blade supporting tube portions 4 of the hub are bored on three diameters 90, 91 and 92 to receive the blade mountings. The bore portions 90 and 91 lie close to but out of contact with adjacent end portions of a hardened bearing and blade-root-lamp-supporting sleeve 93 having a relatively large outer cylindrical portion or flange 94, the end face of which is grooved to form a ball race for a main axial thrust bearing constituted by a ball assembly 95, said groove and a coacting race groove in a hardened threaded main blade root retaining annular nut 96. The annular space between the sleeve 93 and the inner wall of the tubular hub portions 4 (defined also by the inner end of the bore 91 and the flange 94) contains a set of radial thrust rollers 97 (e. g. needle bearings).

The shank of the blade 5, which is provided with grooves 98 and 99 of buttress thread cross sectional contour, is received snugly between half tubes or shells 100 and 101 of suitable tough metal which shells complement each other to form a blade root encircling and retaining sleeve or anchor 102 with internal ribs substantially complementary to the peripheral grooves 98 and 99. The inner end of the composite sleeve 102 formed by the two halves 100 and 101 is in the form of a thickened flange 103 abutting the inner end of the blade root and provided with coarse internal screw threads 104. The bearing-constituting sleeve 93 may be pressed over the two half sleeves 100 and 101, so that the blade, half sleeves and sleeve 93 comprise a permanently rigid sub-assembly unit which is virtually an integral part of the blade. The sub-assembly is completed to form the entire "blade" portion of the blade mounting by a hollow coupling piece 105 in the form of a nut with screw threads adapted to be screwed very tightly into the threads 104 of the composite sleeve 102 and into abutment with the radially inward end portion of the blade root or shank of blade 5. A flange 106 of the coupling piece or nut 105 abuts the inner ends of the composite anchor sleeve 102 and also the inner end of the needle (radial thrust) bearing race sleeve 93.

The driving connection between the blade and the worm-wheel-driven stub shaft 78 includes the radially outward splined portion 87 of said stub shaft and complementary splines on the coupling piece 105 of just sufficient length (outwardly toward the blade 5) to receive the splined end of the stub shaft 78 without crowding. Thus the stub shaft 78 is retained by the coupling piece 105 against movement by centrifugal force outwardly toward the blade from the position in which shown. The coupling piece 105 has wrench openings 107 and the inner end of the coupling piece has an annular axially open groove in which is firmly seated, as by a press fit, shrinking or spinning operation, a bronze or other suitable bearing ring 108 arranged to abut an adjacent face 109 of the hub carrier portion 70 which is accurately machined and finished (e. g. polished) so as to be parallel to the adjacent face of the bearing ring.

*Blade shank locking etc.*

When the blade root or shank assembly is completed to the extent of screwing on the coupling piece 105, a central stud 110 with screw threads inclined opposite those of the coupling piece (e. g. right hand threads on 110 and left hand on 105) is screwed tightly into complementary close fitting threads of the blade root or shank, so that a head portion 111, adapted operatively to abut the coupling piece 105 at a central socket thereof, is (in effect) jammed against the coupling piece as an effective locking means for preventing relative turning of coupling piece threads (at 104) out of seated position in the composite sleeve 102. If necessary the abutment between the head 111 of the stud and the coupling piece is effected through the intermediary of one or more propeller-balancing washers 112; and, in the case of several washers being used, the one adjacent the stud head 111 would be of tough metal such as steel. The others could be lead or heavier for more effective balancing purposes. Any tendency for the coupling piece 105 to be unscrewed is resisted by the locking stud because the unscrewing direction of rotation as to the coupling piece tends to screw the stud more tightly into place and the reverse, of course, obtains.

When the blade mounting assembly described above is inserted into position in the tubular branch 4 of the hub, together with the radial and outward thrust resisting bearings 97 and 95, respectively, the main locking ring is screwed in at the threads 92 to take up all play axially of the propeller blade, this operation moving the thrust bearing ring 108 into contact with the hub carrier 10. The ring 96 is then locked in place by conventional inset key blocks 113 secured by wired-on cap screws 114. The number and arrangement of key blocks can be varied for balancing purposes if necessary.

A clamp and water-excluding sealing ring 115 is preferably screwed onto slightly tapered threads (at 116) of a portion of the composite sleeve 102 which extends outwardly in snug encircling contact with the blade shank beyond the main retaining nut 96. The clamping rings 115 of all the blades may be keyed and locked to the composite sleeve 102 in much the same manner as the ring 96 is secured, as will be evident from Fig. 7 without special description. The matching edges of the shells 100 and 101 are pressed firmly together by the clamping ring 115 to eliminate all water-receiving crevices.

The needle bearing assembly and the main thrust bearing assembly would ordinarily have conventional retainers (not shown); and, by unscrewing any one of the main retaining ring nuts 96 from its position in the associated radial hub tubes 4, the entire blade assemblies can easily be removed and inspected or replaced without disturbing any part of the blade-pitch-controlling gearing which latter is wholly independent of the blade assembly and borne entirely on the hub carrier as already explained.

Pitch limit mechanism

Referring to Figs. 2, 3 and 8, the main front face 120 of the blade-equalizing, miter, ring gear 83 is generally flat but has (Fig. 3) two coplanar rearwardly indented faces 121 and 122 and a further rearwardly indented intermediate face 123, forming abrupt radial shoulders 125—126 and 127—128. The shoulders form limit stops for cooperation with an electrically adjustable pitch-movement-limiting pin 124 slidable in a hole through the end plate 12 of the hub assembly parallel to the propeller shaft axis. The inner end of the pin 124 has flat faces 130 (Fig. 8) for engagement with the limiting shoulders 125 etc., and the outer (forward) end is secured, as by riveting to a flange 131 of a collar 132, easily slidable but definitely non-rotatable on the main hub nut 15, for movement rearwardly toward a shoulder 133 thereof. The collar 132 can, for example, be prevented from turning with reference to the hub carrier 10 by reason of spline teeth between the collar 132 and the hub end plate 12. The main hub nut 15 also carries, rigidly thereon, a mounting collar 134 for the solenoid 21, earlier mentioned, and said collar has a flange 135 in axially spaced relation to the flange 131 of the mounting collar for the pin 124. The collar 134 can be pressed onto the outer end of the main hub nut or otherwise fastened rigidly thereto so that it cannot turn on said nut. An end plate 136 (fastened to the collar 134 by wire-on screws as evident from Fig. 8) cooperates with said collar 134 to form a mounting for the solenoid coils. The collars 132 and 134 are of suitable soft iron so that the flange 135 constitutes an electromagnet pole piece and the flange 131 of collar 132 a movable armature in reference to the coil 21.

Electromagnetic pitch limit control

When the aircraft is in normal operation the limit selecting pin 130 is maintained closely adjacent the face 123 (Fig. 3) of the miter ring gear (between shoulders 125 and 126 thereof) by reason of deenergization of the coil 21 and operation of suitable springs 137 (e. g. three or four in number) between the flanges 131 and 135 of respective collars, and retained as in sockets 138 in the flange 135. Upon energization of the coil 21 the pin-carrying collar 132 is thrust forwardly by reason of the force of the magnet overcoming the strength of the springs; and then the pin (at end faces 130) allows greater angular movement of the ring gear, as over the faces 121 and 122 to the limit shoulders 127 and 128 respectively, depending upon the instantaneous operation of the pitch control gearing, etc.

To supply current to the solenoid (and for blade position indication as will be described later), Figs. 2 and 8 show a conductor cable 140 passed through a channel opening 141 formed in the various hub elements, but principally through the hub carrier 10. One conductor strand extends to a terminal of the coil 21 through a hard insulation tube 142 (Fig. 8) bridging the hub front plate 12 and pole piece flange 135, and the other terminal of the coil is suitably grounded to the propeller frame. The cable 140 extends rearwardly and the feed strand of the coil is connected to one of two commutator or collector rings 145 and 146 fastened to an annular block of insulation material 147 (Figs. 2 and 8) on a reduced portion of the rearward tubular extension 45 of the hub carrier. A brush 149 (Figs. 2 and 5) carried on the fixed (non-rotatable) mounting block or plate 62 of the brake mechanism carries the current as through a conductor 150 to a switch 151 at the operator's position or instrument board.

The annular block of insulative material 147 may be secured in position on the rear end of the hub carrier extension (and thereby also made to hold the brake wheels 40 and 41 in proper place axially of the hub, through abutment of the insulative block 147 with the brake wheel bearing bushing 44 at flange 44' thereof), by a threaded ring and locking pin assembly 152 similar to the clamping ring arrangement (115 etc.) for the blade shank anchor shells.

Automatic limit control switch

The switch 151 is preferably a resistance trip switch so that after it has been closed for a sufficient time to enable operation of the blade adjusting gearing to one of the extreme positions (feathering and reverse, incident to movement of the miter ring gear 83 such that the selective limiting pin 124 is poised over the faces 121 or 122 of the ring gear) the switch will automatically open and prevent the coil 21 from being subjected continuously to current.

If the operator accidentally closed the switch 151 at a time when flight conditions were normal (i. e. not calling for feathering or reverse) battery power would be wasted and possibly the coil 21 would be burned out. The switch 151 may, in practice, be selected or regulated for 10 second throwout time, which is much more than ample for feathering or reverse operations with the present pitch control mechanism.

Pitch angle indicator

For indicating to the pilot the instantaneous pitch position of the blades at all times a suitably insulated resistance element 155 concentric with the propeller hub axis (Figs. 2 and 8) is inset into the rear face of the hub end plate 12 for cooperation with an electrically grounded brush carried on the equalizing ring gear 83. The brush 156 has a spring 157 to cause the brush to wipe arcuately spaced resistance coils or contact parts of the resistance element, which later is connected at one end, through the conductor cable 140, to one of the collector rings 145 and 146. From there, the current leads, as through a ring-contacting brush 158 (Figs. 2 and 5) and conductor 159, to an ammeter or milliammeter 160 and a source of power, also grounded to complete a circuit through the portion of the resistance interposed, electrically, between the instrument 160 and the brush 156.

By graduating the dial of the instrument 160 to read in terms of pitch angles, and calibrating the resistance 155 in relation to the angular movement of an indicator 161 over the dial, the pitch angle change from full reverse to full feathered blade position can be made apparent as will be obvious from Fig. 2 hereof in view of the above description, since the indicator will move in accurate relationship to the angular travel of the brush 156 over the resistance 155.

Brake mechanism—Cont'd

Referring again to the brake mechanism (Figs. 2 and 5) the block or brake mechanism carrier 62 may be fastened to the engine housing or crank case by appropriate bolts or other means, and said block has a main portion 64 of disc like form axially overlying the outer rim of the brake wheel 48.

close thereto, and complementing the same to form an enclosure for the brake mechanism. Additionally, the block 62 has stepped cylindrical portions turned thereon at 65 and 66 to support the sets of brake shoes 60 and 61 respectively. A counterbored central bore 67 of the block 62 surrounds and clears the propeller shaft and the insulation block 147 to permit free rotation thereof.

The brake shoes 60 and 61, as shown, are semicircular or approximately 180° ring segments in pairs, each pair constituting a complete brake shoe assembly substantially surrounding the respective stepped portions 65 and 66 of the block or carrier 62.

Figure 5:
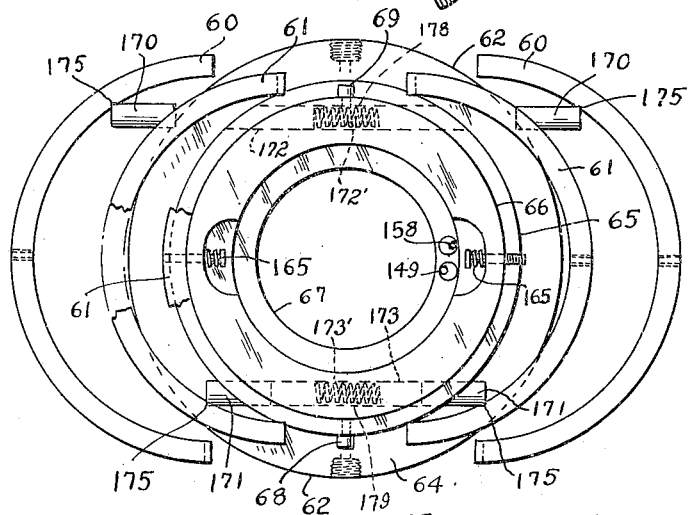
Fig. 5 is an exploded, end elevational view showing two brake wheels, associated brake shoes and operating mechanism thereof for actuating the cam mechanism of Fig. 4.

As shown or brought out by Figs. 2 and 5 the brake shoe ring halves or segments are normally maintained in embracing relation to the stepped supporting surface of the block or plate 62 (out of contact with the wheels 40 and 41) by respective spring and stud assemblies 165 (one assembly shown, Fig. 5) supported in said block or plate 62. Adjacent ends of the shoes 60 are recessed to abut (for alignment and pivotal brake reaction) a radially extending pin 68 on the brake carrier block 62. Similarly the shoes 61 are formed, at mutually adjacent ends, to abut a radially extending pin 69 on the carrier diametrically opposite the pin 68. Thus, assuming rotation of the hub 10, if the free ends of respective pairs of brake shoes are spread apart, braking or retarding of the wheels 40 and 41 results, and the blades are turned through short successive increments of adjustment, in pitch changing directions, the effective character of which depends upon which pair of brakes is rendered effective.

Ordinarily, the outer brake wheel 40, which has the greater effective force, having the greater diameter, operates to increase blade pitch angle by turning the star wheels clockwise, Fig. 4 (counterclockwise, Fig. 1). The arrangement may be reversed by reversing the pitch of the worm threads 27 in event of use of specially counterbalanced blades.

*Brake actuating fluid control*

To actuate the brake shoes 60 and 61 (see Fig. 5) hydraulically operable or other fluid operable pairs of plungers 170 and 171 are guided in tangential bores 172 and 173 in the brake mounting plate or block 62, and the outer ends of the plungers abut the shoes at appropriate kerfs or notches 175 in the various brake shoes to make positive and instantaneously effective the oppositely directed brake shoe operating motions of the plungers. Springs 172' and 173' hold the plungers in contact with the respective notches or kerfs of the brake shoes so that the plungers are always in readiness to actuate said shoes outwardly when the plunger cylinders are supplied with fluid under pressure.

Hydraulic (or other) operating fluid is fed to the plunger cylinder chambers 178 and 179 as by a reversible actuator 180 (Fig. 2) having an operating handle 181 which, when moved in one direction (e. g. clockwise), will actuate the brake shoes to cause retarding of the brake wheel 40 and turn the pitch control gearing in one direction and which, when moved (e. g. counterclockwise), will cause an opposite turning movement of the gearing. 185 designates a storage reservoir for hydraulic fluid.

*Summary of operation*

The operation of the mechanism has been explained in connection with the above description of the various parts, but to summarize:

The operation of one set of brake shoes, 60 or 61, causes the wheels 40 or 41 to turn the worm shafts 26 in one direction and the operation of the other set causes the worm shafts to be turned in the opposite direction, thus changing the pitch setting of the blades in the direction desired by the pilot and as effected by appropriate movement of the control handle 181. The unusual operations of feathering and reverse require simply closing of the switch 151 to withdraw the limit stop pin 124 to a position such that the equalizing miter (ring) gear 83 can move beyond the ordinary low-to-high pitch limits, and then operating the control handle 181 in the appropriate direction depending upon the desired unusual blade pitch setting and for a time determined by the degree or angle of adjustment required to meet the instantaneous condition or problem of flight presented. The pilot has, as heretofore described, continual knowledge of the actual blade pitch setting, through observation of the indicator 130. Propeller blade pitch may be changed fairly rapidly if desired, it being possible to change from low pitch to high pitch in less than two seconds, and from any normal flight pitch to feathering or reverse in about the same time, or a much more gradual change can be effected if desired.

I claim:

1. In a controllable pitch propeller, a hollow hub, a hub carrier adapted for connection with a propeller shaft, extending inside the hub along said shaft and keyed thereto, blade pitch changing worm shafts journaled in the carrier parallel to the propeller shaft and having rotary driving elements thereon, coaxial drum elements, bearings on the carrier supporting the drum elements, said drum elements having driving connections with the rotary elements and operative to turn the worm shafts to adjust the blades, brake elements arranged to act on the drum elements to render the latter operative, and axial thrust bearings for each of the worm shafts, one supported in a bearing member for one of the brake wheel elements and the other adjustably supported in a part of the hub carrier.

2. The mechanism according to claim 1 wherein said other thrust bearing for the worm shaft includes a bearing assembly in axial abutment with the worm shaft and a plug in screw-threaded engagement with a part of the hub carrier and positioned to abut the bearing assembly.

3. In a controllable pitch propeller, a blade equalizing gear for and common to a plurality of blades, a recess in an axially directed face of the gear, another recess circumferentially and axially beyond the first recess but adjacent thereto, a movable limit stop cooperable with circumferentially opposite walls of the first recess and means to adjust the stop for cooperation only with a wall of such other recess.

4. In a controllable pitch propeller, a hollow hub having radial blade mountings, a hub carrier adapted to be mounted rigidly on a propeller shaft, said carrier projecting within the hub and being connected with the hub so as to support the latter on the shaft, radial bores in the carrier in alignment with the blade mountings, bevel gears in said bores connected to the blade mountings, a bore in the carrier coaxial with the propeller shaft surrounding the same and intersecting the said radial bores, and a bevel gear borne in the axial bore and in constant mesh with the bevel gears of said radial bores.

5. The arrangement according to claim 4 wherein the radial bevel gears have worm wheels drivingly rigid therewith supported wholly on the hub carrier, and pitch adjusting worms are supported on the hub carrier parallel to the propeller shaft and in meshing relation to the worm wheels.

6. In a controllable pitch propeller, a hub with radially extending rotarily adjustable blade mountings, equalizing mechanism connecting the blade mountings for insuring simultaneous rotary movement thereof, said mechanism including a movable element having spaced abutment shoulders, a movable pitch-limiting latch cooperative with said shoulders for normal range pitch limiting of the mounting, said latch being movable out of position cooperating with said shoulders, and another abutment shoulder on said element engageable by the latch when so moved for enabling limited pitch adjustment beyond such normal range.

7. In a controllable pitch propeller, a hub with radially extending rotarily adjustable blade mountings, equalizing mechanism connecting the blade mountings for insuring simultaneous rotary movement thereof, said mechanism including a movable element having a pair of abutment shoulders spaced apart for movement with said element in a common plane, a pitch-limiting latch means operatively interposed between said shoulders for engagement therewith for normal range pitch limiting of the mountings, said latch means being movable out of said position between the shoulders, and another abutment shoulder on said element removed from said plane and engageable by the latch means when so moved for enabling limiting of pitch adjustment beyond such normal range.

8. In a controllable pitch propeller, a hub with radially extending rotarily adjusable blade mountings, bevel gear elements in the hub respectively drivingly connected with the mountings, a master pitch equalizing ring with bevel gear teeth in mesh with the bevel gear elements, means on the hub for rotatably supporting the ring, a set of circumferentially spaced abutment shoulders formed on the ring, latch means removably positionable between the abutments for limiting pitch adjustment of the mountings to a predetermined range, and another abutment shoulder formed on the ring circumferentially beyond one of the first mentioned abutment shoulders and cooperable with said latch means to enable pitch adjustment beyond said range.

GORDON W. HARDY.

REFERENCES CITED

The following references are of record in the file of this patent:

UNITED STATES PATENTS

| Number | Name | Date |
|---|---|---|
| 1,203,557 | Gallaudet | Oct. 31, 1916 |
| 1,690,034 | Noble | Oct. 30, 1928 |
| 1,776,650 | Carter | Sept. 23, 1930 |
| 1,833,843 | Leparmentier | Nov. 24, 1931 |
| 1,851,874 | Seppeler | Mar. 29, 1932 |
| 1,857,392 | Nixon | May 10, 1932 |
| 1,875,598 | Heath | Sept. 6, 1932 |
| 1,915,465 | Kohlstedt | June 27, 1933 |
| 1,936,677 | Kozub | Nov. 28, 1933 |
| 1,964,102 | Wishon | June 26, 1934 |
| 1,985,041 | Lambert | Dec. 18, 1934 |
| 2,138,339 | Chauviere | Nov. 29, 1938 |
| 2,144,007 | Austin | Jan. 17, 1939 |
| 2,164,489 | Berliner | July 4, 1939 |
| 2,197,814 | Taber | Apr. 23, 1940 |
| 2,223,081 | Thomas | Nov. 26, 1940 |
| 2,248,590 | Smith | July 8, 1941 |
| 2,276,347 | Ruths | Mar. 17, 1942 |
| 2,315,213 | Linehan | Mar. 30, 1943 |
| 2,346,007 | Chillson | Apr. 4, 1944 |

FOREIGN PATENTS

| Number | Country | Date |
|---|---|---|
| 230,162 | Great Britain | Mar. 3, 1925 |
| 772,115 | France | Oct. 23, 1934 |